United States Patent [19]
Schunck et al.

[11] Patent Number: 6,053,584
[45] Date of Patent: Apr. 25, 2000

[54] METHOD AND DEVICE FOR CONTROLLING A BRAKE SYSTEM

[75] Inventors: Eberhardt Schunck, Landau; Ulrich Gottwick, Stuttgart, both of Germany

[73] Assignee: Robert Bosch GmbH, Stuttgart, Germany

[21] Appl. No.: 09/015,854

[22] Filed: Jan. 29, 1998

[30] Foreign Application Priority Data

Jan. 31, 1997 [DE] Germany .......................... 197 03 688

[51] Int. Cl.⁷ .................................................... B60T 8/32
[52] U.S. Cl. ................. 303/167; 303/3; 303/113.5; 303/155; 303/186; 303/166; 303/191; 188/349
[58] Field of Search .................................. 303/15, 20, 3, 303/9.61, 89, 167, 166, 191, 113.4, 155, 68, 135, 69, 125, 113.2, 139, 112, 113.5, 186, 187, 188; 188/265, 353, 156, 158, 181 T, 349

[56] References Cited

U.S. PATENT DOCUMENTS

| 4,923,056 | 5/1990 | Nedelk ................................. 303/9.61 |
| 5,129,496 | 7/1992 | Sigl et al. . |
| 5,209,329 | 5/1993 | Sigl et al. . |
| 5,293,966 | 3/1994 | Chareire ................................. 303/9.61 |
| 5,297,856 | 3/1994 | Asano ..................................... 303/9.61 |

FOREIGN PATENT DOCUMENTS

| 4151357 | 5/1992 | Japan ...................................... 303/191 |
| 4151358 | 5/1992 | Japan ...................................... 303/191 |
| 494680 | 10/1938 | United Kingdom . |
| 2 047 830 | 12/1980 | United Kingdom . |

OTHER PUBLICATIONS

Jonner et al., *Electrohydraulic Brake System—The First Approach to Brake–By–Wire Technology*. pp. 105–112, SAE Technical Paper Series, International Congress & Exposition, Feb. 26–29, 1996.

*Primary Examiner*—Douglas C. Butler
*Attorney, Agent, or Firm*—Kenyon & Kenyon

[57] ABSTRACT

A method and a device for controlling a brake system, in which the braking force is regulated in at least one wheel as a function of a driver's command. In an operating state where transition to vehicle standstill is to be expected, the braking force in this at least one wheel is reduced independently of the driver's command.

28 Claims, 4 Drawing Sheets

METHOD AND DEVICE FOR CONTROLLING A BRAKE SYSTEM

FIELD OF THE INVENTION

The present invention relates to a method and a device for controlling the brake system of a motor vehicle.

BACKGROUND INFORMATION

In general, as a constant braking force is applied, friction brake systems tend to decelerate the vehicle more intensely when approaching a standstill than at higher speeds. This is caused by the transition from dynamic friction to static friction on the friction surfaces between brake lining and brake disk or brake cylinder. Therefore a sudden change in deceleration can be felt by the driver at the time of transition from braking to vehicle standstill.

Other forces and changes in forces act upon the driver through the oscillation of the axle suspension if the vehicle has performed a pitching motion caused by the torque during braking. Such effects also appear in known electrically controlled brake systems.

An object of the present invention is to control the brake system so that at least one of these effects felt by the vehicle occupants is reduced, even with an inexperienced driver.

SAE Paper 960991, dated February 1996, describes a brake system for a motor vehicle wherein the wheel brake pressure of the vehicle is set by actuating a valve system as a function of the braking command manifested by actuation of the brake by the driver.

European Patent No. 375 708 (corresponding to U.S. Pat. Nos. 5,129,496 and 5,209,329) describes a method for calculating vehicle deceleration at low vehicle speeds from the wheel speed signals and deriving therefrom the time when the vehicle stops by extrapolation.

SUMMARY OF THE INVENTION

In an exemplary embodiment of the present invention, the effect felt by the occupants during the transition from dynamic friction to static friction on the friction surface between brake lining and brake disk or brake cylinder when stopping is reduced and thus travel comfort is significantly improved. In addition, the effect of oscillations by the axle suspension felt by the vehicle occupants is considerably reduced.

It is particularly advantageous that, by taking the driver's braking command into consideration, the driver's influence on the braking effect is maintained during the transition from braking to standstill, and the driver can quickly bring the vehicle to a standstill if required by the traffic situation.

It is furthermore particularly advantageous that no undesired lengthening of the braking distance occurs due to the method of the present invention.

Another advantage is that the method according to the present invention can be used with any brake system where the driver command is detected. Such brake systems include, in addition to electrohydraulic brake systems, electropneumatic or electromechanical brake systems. The method according to the present invention, however, can also be used in conventional brake systems with ABS, ASR, and/or FDR function when means for detecting the driver command or for deducing the driver command are available.

DETAILED DESCRIPTION

Figure 1:
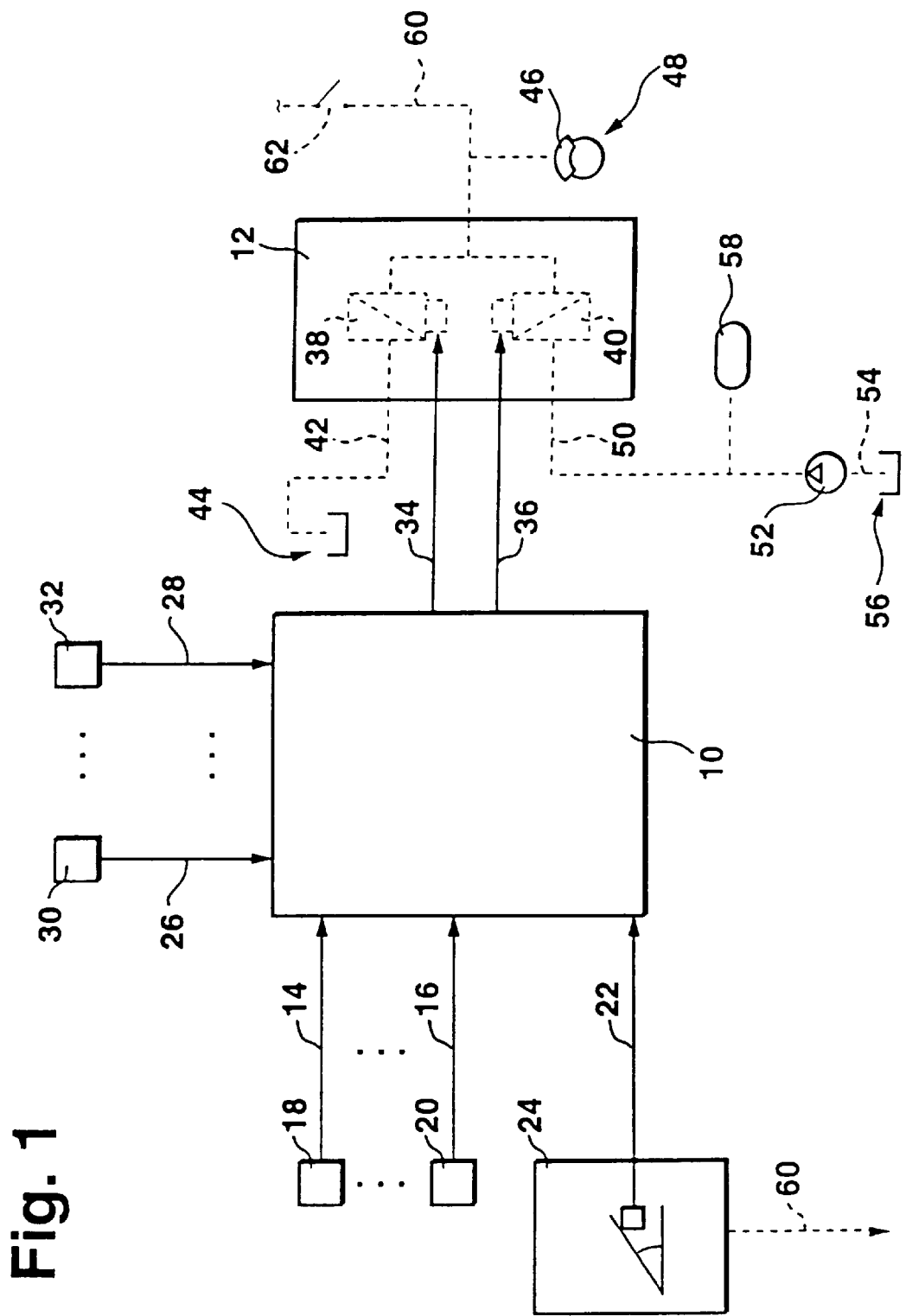
FIG. 1 shows a schematic block diagram of an electrically controlled braking system, e.g., an electrohydraulic braking system.

FIG. 1 shows a block diagram of an electrohydraulic brake system of a motor vehicle. Electronic controller 10 controls a hydraulic brake system 12 that is provided with appropriate valve arrangements. For this purpose, electronic controller 10 receives input lines 14 through 16 from measuring devices 18 through 20 to measure the braking pressures, braking torques, or braking forces accumulated in the wheel brakes. The electronic controller 10 also receives an input line 22 from at least one measuring device 24 for measuring the extent of brake pedal actuation (e.g., pedal stroke and/or pedal force and/or pre-pressure (pressure generated in the main brake cylinder)). Additionally, the electronic controller 10 receives input lines 26 through 28 from measuring devices 30 through 32 for measuring additional operating parameters of the brake system or the vehicle or of the traffic situation, such as wheel speeds, yaw rate sensor, sensor for distance control, etc.

The electronic controller controls the electrically actuated valves of the hydraulic brake system 12 via output lines. For the sake of clarity, only output lines 34 and 36 controlling a pressure reducing valve 38 and a pressure buildup valve 40 of a wheel brake are illustrated. Similar arrangements are provided on the other electrically controlled wheel brakes, at least for the wheel brakes of the same axle or for all wheel brakes of the vehicle.

Pressure reducing valve 38, which, in the exemplary embodiment is in the blocking position when not actuated and open when actuated, is installed in a hydraulic line 42 (represented by a dashed line) leading from brake cylinder 46 of wheel 48 to an accumulator container 44. Similarly, pressure buildup valve 40, which in the exemplary embodiment is in the blocking position when not actuated and open when actuated, is installed in a hydraulic line 50, which leads from a pressure-generating pump 52 to wheel brake cylinder 46. On the suction side, pump 52 is connected to an accumulator container 56, which may be identical to accumulator container 44, via a hydraulic line 54.

In normal operation, electronic controller 10 detects the driver's braking command from the degree of actuation of the brake actuation device (e.g., joystick, brake pedal). The braking command is converted into a setpoint for the braking pressures to be set at the individual wheel brakes according to a predefined braking force distribution between front and rear axle brakes. This pressure is set in the pressure regulating circuits taking into account the measured pressures by actuating the appropriate valves 38 and 40. When pressure is to be built up, the pressure medium flows from the accumulator container via pump 52 and line 50 through the open pressure buildup valve 40 into wheel brake cylinder 46. When the pressure is to be reduced, pressure buildup valve 40 is closed, pressure reducing valve 38 is opened, so that the pressure medium flows back into the accumulator container via line 42. Electronic controller 10 also includes an anti-lock or traction control, a travel dynamics regulator, and/or an automatic travel speed regulator with distance measurement, which reduce or increase the pressure on at least one wheel when a tendency to lock or spin is detected or under travel conditions that are critical for travel stability.

In addition to regulating the pressure in the wheel brakes, in other exemplary embodiments, and in particular in electromechanical braking systems, the driver's braking command is implemented by regulating the braking torque, the braking force, the wheel speed, the wheel spin, etc.

In such braking systems, a change in deceleration and/or the forces caused by the oscillations of the axle suspension, which act on, and can be felt by the driver, may occur when the vehicle is brought to a standstill. The deceleration of the vehicle can be estimated by analyzing (e.g., differentiating) the wheel speeds or the reference speed formed from the wheel speeds. If the driver desires a certain braking effect, the point at which the vehicle will stop if the driver's braking command is kept constant can be computed, as is known from the references cited above. This procedure is used under operating conditions where the vehicle speed is less than a speed that can still be detected by the wheel speed sensors. The instantaneous speed of the vehicle can also be determined under these operating conditions by extrapolating the vehicle deceleration. In order to reduce sudden changes in deceleration when coming to a standstill, it may be provided that the driver's braking command is no longer converted into braking pressures predefined by the braking force distribution when coming to a standstill is expected, but, instead, progressively diminishing pressures are set. The pressures are selected so that deceleration drops monotonously from the initial level to lower levels. This can cause the time needed to come to a standstill to be extended. No increase in deceleration occurs at the end of braking. The changes in the inertial forces acting on the vehicle and the driver at the end of partial braking are therefore smaller. Comfort is substantially improved.

In an exemplary embodiment, it has been shown to be appropriate to enter the aforementioned operating state when the vehicle speed is lower than a predefined limit value (on the order of 3 km/h), the brake pedal stroke is smaller than a predefined limit value, and the driver's braking command remains constant. Progressively lower pressures are no longer set when a braking force-enhancing intervention by the driver, a critical situation regarding travel stability, or an undesired lengthening of the braking distance occurs. Examples of such situations include the presence of ABS braking, panic braking by the driver (e.g., change in the pedal stroke over time exceeds a certain limit value, e.g., 0.5 m/s), increasing pedal actuation, or drop in the braking action (in particular in braking pressure) from the initial value by a certain value. Other, similar criteria for aborting pressure regulation are possible.

Alternatively, or in addition, the braking action may be selected between the front wheels and the rear wheels according to the axle kinetics so that vehicle pitching is minimized. For this purpose, the braking force is shifted between the front and rear wheels under certain operating conditions as the vehicle approaches a standstill. Basically the same on and off conditions apply for this function as for setting progressively diminishing pressures. It is, however, advantageous when braking force shifting is initiated at a speed that is different from the speed that applies for braking force reduction (preferably applicable to each vehicle).

Figure 2:
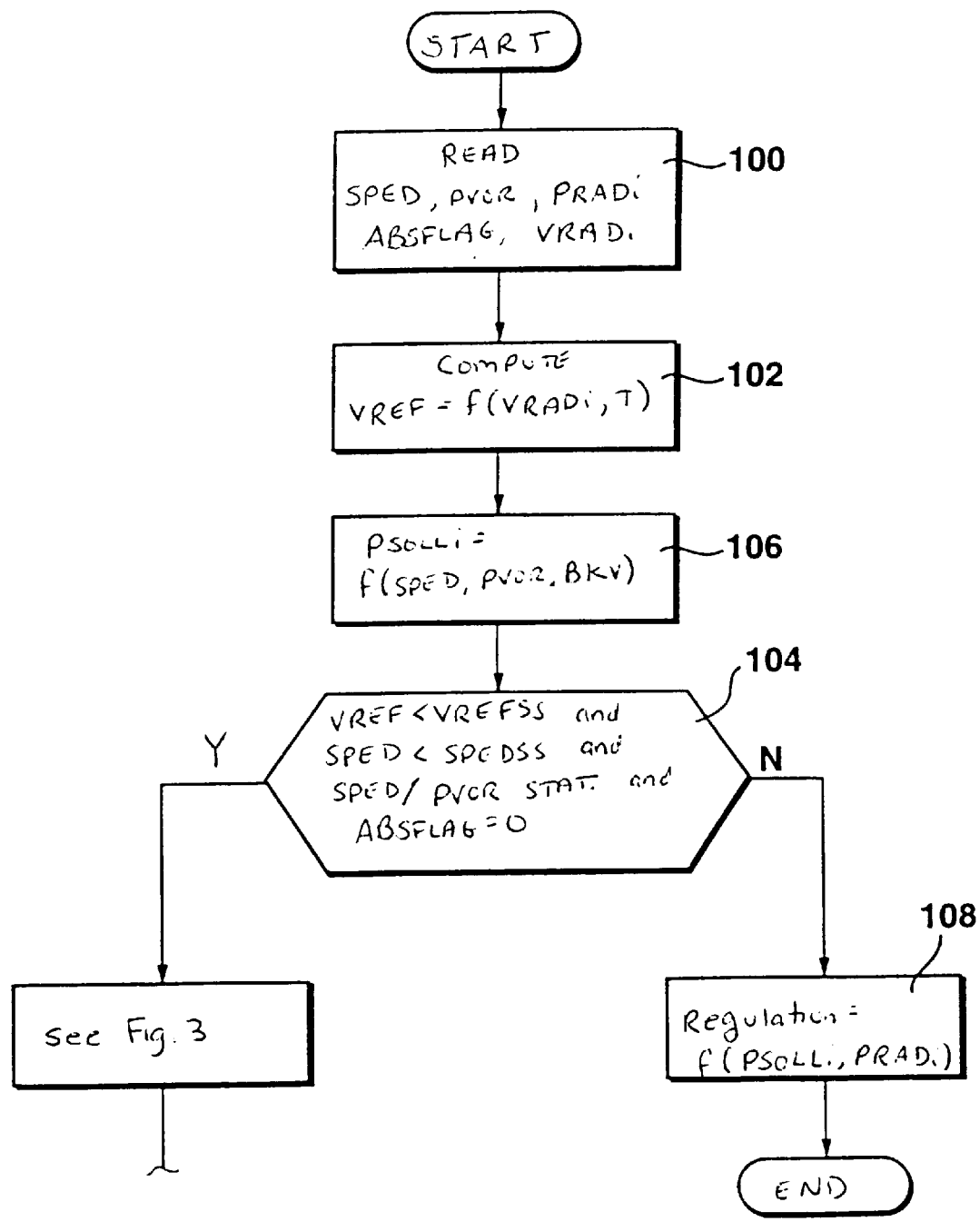
FIG. 2 shows a flow diagram representing the method according to the present invention in the form of a computer program.
Figure 3:
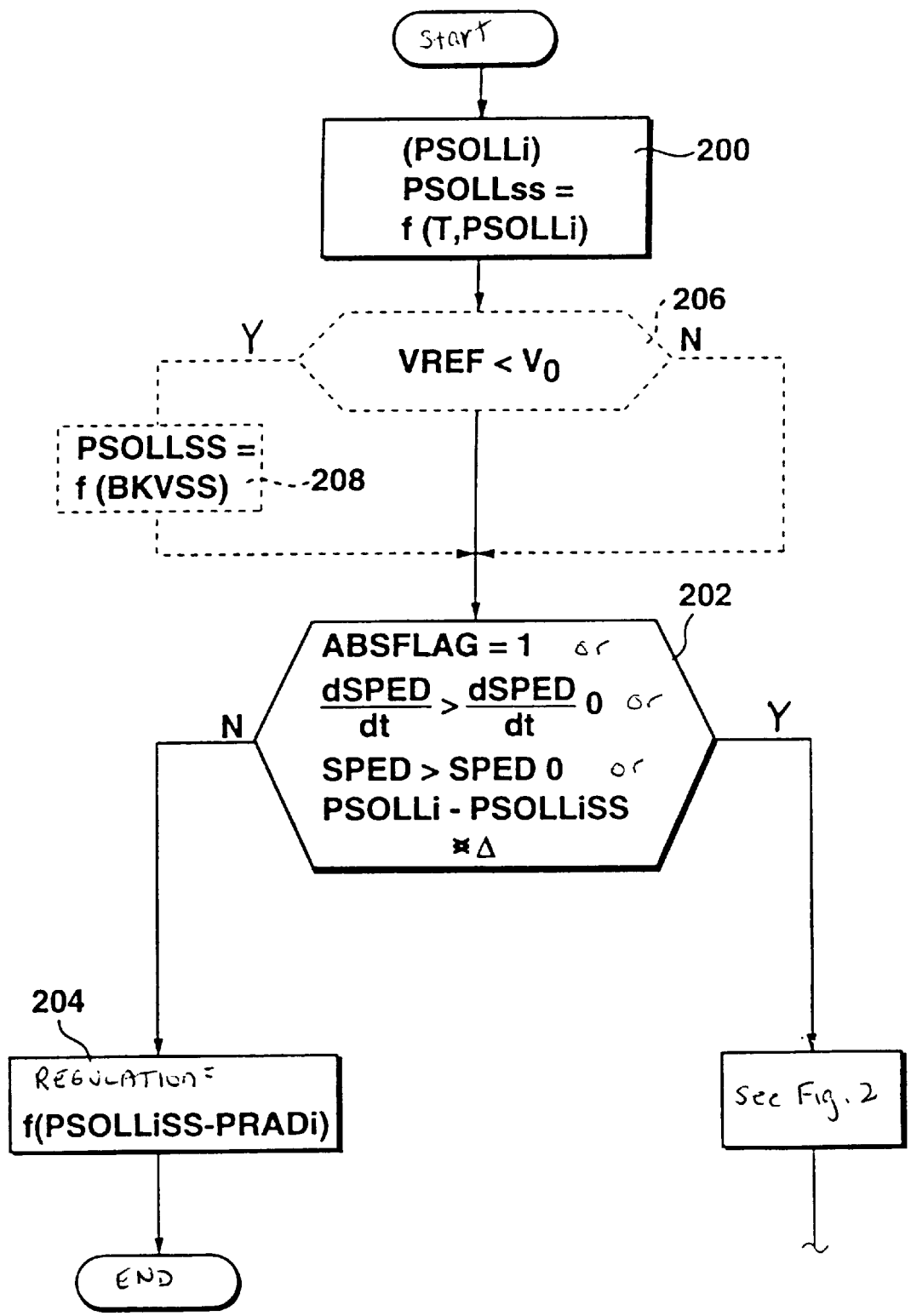
FIG. 3 shows a flow diagram of smart stop logic in accordance with the present invention.

The above method according to the present invention is implemented in the exemplary embodiment as a program of the at least one computer of controller 10. FIGS. 2 and 3 are schematic flow charts illustrating an example of such a computer program.

The program is started at predefined times during braking. After the program starts, the brake pedal stroke SPED, pre-pressure PVOR, wheel brake pressures PRADi, wheel speeds VRADi, and a flag (ABSFLAG), indicating an active anti-lock control (or travel dynamics control) are read in step 100. In the following step 102, the reference speed VREF is extrapolated on the basis of the vehicle deceleration VERZ0 at a certain speed according to the procedure known from the related art for a speed range for which the speed sensors no longer provide a reliable signal. In the subsequent step 106, the reference pressures PSOLLi are computed on the basis of the driver's command (SPED and/or PVOR) and the predefined braking force distribution (BKV) between front and rear axles. Then in step 104 it is checked whether the conditions for initiating braking force reduction (smart stop logic) are present. In an exemplary embodiment these are, as mentioned previously, the reference speed dropping below a threshold value VREFSS, the braking pedal stroke dropping below a threshold value SPEDSS, the braking command, determined from the braking pedal stroke and/or pre-pressure, being stationary, and no ABS intervention being present. The value of the instantaneous vehicle speed is deduced either from the measured wheel speeds or from the deceleration according to step 102. If any of the aforementioned conditions is not met, the control for each wheel is performed on the basis of the respective setpoint and actual braking pressure, and the program is ended. If all conditions are met according to step 104, the smart stop logic according to FIG. 3 is initiated, and the program is run as outlined at predefined times.

In the first step 200, the setpoints PSOLLi computed in step 106 are read (or computed), and a correction of these setpoints is performed in the sense of reducing the braking force on at least one axle, by forming setpoints PSOLLiSS with the help of a given time function on the basis of the setpoints computed in step 106. The time function is started when the program is initiated for the first time. In the exemplary embodiment, the time function is a linear function, but may have a different (for example, exponential) form in other embodiments. Instead of a time function, the braking pressures to be set can also be computed using the calculated deceleration and vehicle speed according to a given fixed algorithm, so that PSOLLSS is computed and set directly. Then in step 202 it is checked whether the logic is to be aborted. This is the case if an anti-lock or travel dynamics control is active (ABS flag=1), if the driver has initiated panic braking, and the rate of change of the braking pedal actuation stroke exceeds a certain threshold, the pressure drop (e.g., PSOLLi-PSOLLiSS) has exceeded a predefined threshold value Δ at least on one wheel within the smart stop logic, or the braking pressure (PRADi) on at least one wheel has dropped by a given amount, or has reached a predefined minimum value. If any of these conditions are met, regular control according to FIG. 2 is resumed; if none of those conditions is met, control on the basis of the reduced setpoints and the measured wheel brake pressures is performed according to step 204.

In an exemplary embodiment, a second speed threshold V0 is provided in step 206, which is less than the threshold checked for in step 104. If speed VREF is less than this threshold, the individual setpoints for the wheels are determined in step 208 taking into account the modified braking force distribution BKVSS. The normal braking force distribution between the rear wheel brakes and front wheel brakes is changed in this case. This can also be accomplished by suitably selecting the time functions for the rear and front wheel brakes in step 200, which reduce the front wheel brake pressures differently from the rear wheel brake pressures. After step 208, the procedure continues with step 202 just as in the case of a "no" answer in step 206.

Figure 4A:
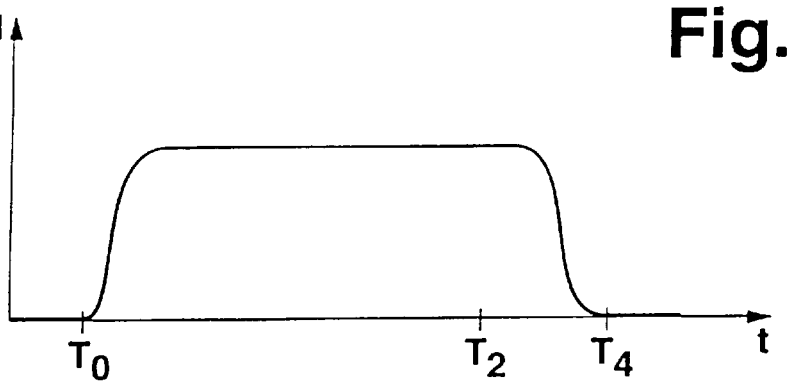
FIG. 4a shows a first time chart illustrating the method according to the present invention.
Figure 4B:
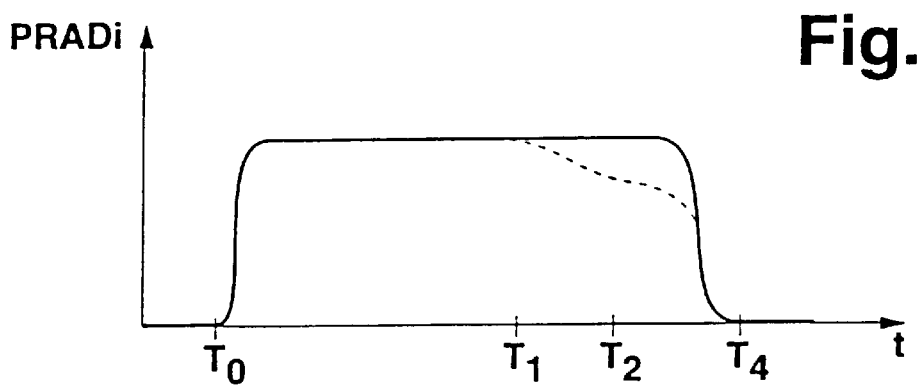
FIG. 4b shows a second time chart illustrating the method according to the present invention.
Figure 4C:
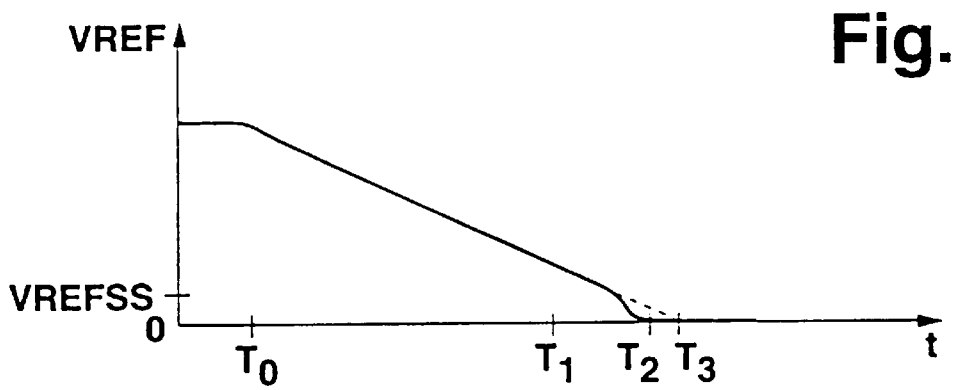
FIG. 4c shows a third time chart illustrating the method according to the present invention.
Figure 4D:
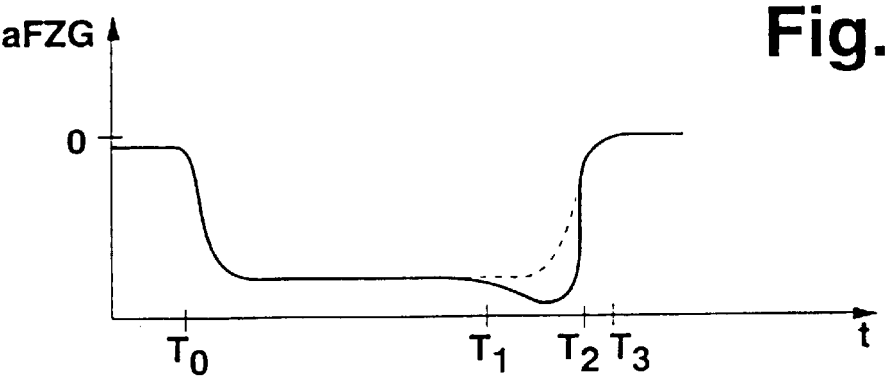
FIG. 4d shows a fourth time chart illustrating the method according to the present invention.

FIGS. 4a–4d illustrate the method according to the present invention using time charts. FIG. 4a shows the variation of brake pedal stroke SPED, FIG. 4b shows the variation of brake pressure PRADi in a selected wheel, FIG. 4c shows the variation of the reference speed VREF, and FIG. 4d shows the variation of the vehicle deceleration aFZG. At a time T0, the driver actuates the brake pedal (see FIG. 4a). The braking pressure increases accordingly in the selected wheel (FIG. 4b). Extrapolation and computation of the reference speed starts according to FIG. 4c. As braking starts, vehicle deceleration increases according to FIG. 4d. At time T1, the computed reference speed drops below threshold value VREFSS. At this time, the wheel pressure drops as shown by the dashed curve of FIG. 4b. This occurs according to a given time function, i.e., a given relationship between vehicle deceleration and vehicle speed. At time T2, the vehicle would come to a standstill with normal braking (see solid line), with the vehicle deceleration increasing between times T1 and T2. Due to the method according to the invention, the vehicle does not come to a standstill until time T3, with the vehicle deceleration not decreasing between times T1 and T2 (see FIG. 4d, dashed curve). At time T4, the driver has released the pedal, and the braking pressure in the selected wheel is 0.

What is claimed is:

1. A method for controlling a braking system in a vehicle, the vehicle having a plurality of wheels and a plurality of operating states, the operating states including a vehicle standstill state, comprising the steps of:
   regulating a braking force in at least one of the wheels of the vehicle as a function of a braking command issued by a driver of the vehicle;
   determining whether a transition to the vehicle standstill state is expected; and
   if the transition to the vehicle standstill state is expected, reducing the braking force by setting progressively diminishing pressures in at least one of the wheels of the vehicle independently of the braking command.

2. The method according to claim 1, wherein the reducing step includes the step of reducing the braking force when a reference speed drops below a predefined threshold value.

3. The method according to claim 1, wherein the vehicle includes a brake pedal having an actuation stroke, and the reducing step includes the step of reducing the braking force when the brake pedal actuation stroke drops below a threshold value.

4. The method according to claim 1, wherein the reducing step includes the step of reducing the braking force if the braking command is constant.

5. The method according to claim 1, wherein the reducing step includes the step of reducing the braking force when no anti-lock control is active.

6. The method according to claim 1, wherein the reducing step includes the step of reducing the braking force such that a braking distance is not lengthened.

7. The method according to claim 1, wherein the vehicle includes a brake actuating device, and the reducing step includes the step of reducing the braking force if the driver has not actuated the brake actuating device to initiate a panic braking.

8. The method according to claim 1, wherein the plurality of wheels include two front wheels and two rear wheels, the braking force being distributed between the front wheels and the rear wheels, and further comprising the steps of:
   determining a speed of the vehicle; and
   changing the braking force distribution when the speed of the vehicle drops below a predefined speed.

9. The method according to claim 1, wherein the braking system is an electrohydraulic braking system.

10. A device for controlling a brake system of a vehicle, the vehicle having a plurality of operating states, the operating states including a vehicle standstill state, comprising:
    an electronic control unit detecting a braking command generated in response to an actuation of a braking pedal of the vehicle by a driver of the vehicle, the electronic control unit setting a braking force in at least one wheel of the vehicle as a function of the braking command, the electronic control unit reducing the braking force by setting progressively diminishing pressures in at least one wheel of the vehicle if a transition to the vehicle standstill state is expected.

11. A method for controlling a braking system in a vehicle having a plurality of vehicle wheel brakes, comprising the steps of:
    determining a braking command;
    determining at least one of at least one wheel brake pressure and at least one wheel speed;
    determining a reference speed;
    determining at least one reference pressure;
    determining if a regulating pressure should be reduced in at least one of the plurality of vehicle wheel brakes based on at least one condition; and
    controlling at least one of the plurality of vehicle wheel brakes using a stopping method that is based on the braking command if the regulating pressure should not be reduced, and using another stopping method that is based on at least another reference pressure if the regulating pressure should be reduced.

12. The method of claim 11, wherein the braking command is at least one of an indication of a brake pedal stroke and at least one pre-pressure.

13. The method of claim 11, wherein the step of controlling the at least one of the plurality of vehicle wheel brakes if the regulating pressure should not be reduced is based on at least one of the at least one reference pressure and the at least one wheel brake pressure.

14. The method of claim 11, wherein the at least one reference pressure is determined based on at least the braking command.

15. The method of claim 11, wherein the at least one condition is at least one of a comparison of the reference speed and a speed threshold, a comparison of an indication of a brake pedal stroke and a brake pedal stroke threshold, the braking command, and an anti-lock control system's active state, a vehicle dynamic control system's active state, and a traction control system's active state.

16. The method of claim 11, wherein the another stopping method includes the steps of:
    determining the at least another reference pressure;
    determining if the regulating pressure should be reduced in the at least one of the plurality of vehicle wheel brakes based on at least another condition; and
    controlling the at least one of the plurality of vehicle wheel brakes based on at least one of the at least another reference pressure and the at least one wheel brake pressure.

17. The method of claim 16, wherein the at least another reference pressure is determined based on at least one of the at least one reference pressure and a time function.

18. The method of claim 16, further comprising the step of modifying the at least another reference pressure based on a modified brake force distribution if the reference speed is no larger than a speed threshold.

19. The method of claim 16, wherein the at least another condition is at least one of a panic braking condition, a comparison of the at least one reference pressure and the at least another reference pressure, an anti-lock control system's active state, a comparison of the at least one reference pressure and the at least another reference pressure, a comparison of a change in the at least one wheel brake pressure and a wheel brake pressure change threshold, an anti-lock control system's active state, a vehicle dynamic control system's active state, and a traction control system's active state.

20. A method for controlling a braking system in a vehicle, the vehicle having a plurality of vehicle wheel brakes, comprising the steps of:
   determining a braking command;
   determining at least one of at least one wheel brake pressure and at least one wheel speed;
   determining a reference speed;
   determining at least one reference pressure;
   determining if a regulating pressure should be reduced in at least one of the plurality of vehicle wheel brakes based on at least one condition, which is at least one of a comparison of the reference speed and a speed threshold, a comparison of an indication of a brake pedal stroke and a brake pedal stroke threshold, the braking command, and an anti-lock control system's active state; and
   controlling at least one of the plurality of vehicle wheel brakes using a stopping method that is based on the braking command if the regulating pressure should not be reduced, and using another stopping method that is based on at least another reference pressure if the regulating pressure should be reduced.

21. The method of claim 20, wherein the another stopping method includes the steps of:
   determining the at least another reference pressure, wherein the at least another reference pressure is determined based on at least one of the at least one reference pressure and a time function;
   determining if the regulating pressure should be reduced in the at least one of the plurality of vehicle wheel brakes based on at least another condition, which is at least one of a panic braking condition, a comparison of the at least one reference pressure and the at least another reference pressure, and an anti-lock control system's active state; and
   controlling the at least one of the plurality of vehicle wheel brakes based on at least one of the at least another reference pressure and the at least one wheel brake pressure.

22. The method of claim 20, further comprising the step of modifying the at least another reference pressure based on a modified brake force distribution if the reference speed is no larger than another speed threshold.

23. A system for controlling a braking system in a vehicle, the vehicle having a plurality of vehicle wheel brakes, comprising:
   means for determining a braking command;
   means for determining at least one of at least one wheel brake pressure and at least one wheel speed;
   means for determining a reference speed;
   means for determining at least one reference pressure;
   means for determining if a regulating pressure should be reduced in at least one of the plurality of vehicle wheel brakes based on at least one condition, which is at least one of a comparison of the reference speed and a speed threshold, a comparison of an indication of a brake pedal stroke and a brake pedal stroke threshold, the braking command, and an anti-lock control system's active state; and
   means for controlling at least one of the plurality of vehicle wheel brakes using a stopping method that is based on the braking command if the regulating pressure should not be reduced, and using another stopping method if the regulating pressure should be reduced, wherein the means for controlling using another stopping method includes:
      means for determining at least another reference pressure;
      means for determining if the regulating pressure should be reduced in the at least one of the plurality of vehicle wheel brakes based on at least another condition; and
      means for controlling the at least one of the plurality of vehicle wheel brakes based on at least one of the at least another reference pressure and the at least one wheel brake pressure.

24. The system of claim 23, wherein the means for determining at least another reference pressure determines the at least another reference pressure based on at least one of at least one reference pressure and a time function, and wherein the at least another condition is at least one of a panic braking condition, a comparison of the at least one reference pressure and the at least another reference pressure, and an anti-lock control system's active state.

25. A method for controlling a braking system in a vehicle, in which a braking force on at least one wheel brake is adjusted based on a braking requirement specified by a driver, the vehicle having at least one operating state in which a transition of the vehicle into a stationary state is to be expected, the method comprising the steps of:
   reducing the braking force, based on at least one reference pressure, at least another reference pressure and at least one wheel brake pressure, on the at least one wheel brake independently of the braking requirement specified by the driver so as to at least prevent an increase in deceleration during the transition of the vehicle into the stationary state when there is another transition from a sliding friction to a static friction at a friction surface of the at least one wheel brake, and
   discontinuing or not initiating the reducing step if at least one predetermined condition exists.

26. A method for controlling a braking system in a vehicle, in which a braking force on at least one wheel brake is adjusted based on a braking requirement specified by a driver, the vehicle having at least one operating state in which a transition of the vehicle into a stationary state is to be expected, the method comprising the steps of:
   altering a braking force distribution by transposing a braking force of at least one front wheel brake and another braking force of at least one rear wheel brake, and
   discontinuing or not initiating the altering step if at least one predetermined condition exists.

27. An electronic controller for controlling a brake system of a vehicle, the electronic controller comprising:
- means for registering a braking requirement specified by a driver,
- means for adjusting a braking force on at least one wheel brake of the vehicle based on the braking requirement; and
- means for reducing the braking force, based on at least one reference pressure, at least another reference pressure and at least one wheel brake pressure, on the at least one wheel brake independently of the braking requirement if a transition of the vehicle into a stationary state is to be expected so as to at least prevent an increase in deceleration during the transition into the stationary state when there is another transition from a sliding friction to a static friction at a friction surface of the at least one wheel brake;
- wherein operation of the means for reducing the braking force is discontinued or not initiated if at least one predetermined condition exists.

28. An electronic controller for controlling a brake system of a vehicle, the electronic controller comprising:
- means for registering a braking requirement specified by a driver,
- means for adjusting a braking force on at least one wheel brake based on the braking requirement; and
- means for altering a braking force distribution by transposing a braking force of at least one front wheel brake and another braking force of at least one rear wheel brake when a transition of the vehicle into a stationary state is to be expected;
- wherein operation of the means for altering the braking force distribution is discontinued or not initiated if at least one predetermined condition exists.

* * * * *